United States Patent [19]

Sumi

[11] 4,385,023
[45] May 24, 1983

[54] METHOD OF MAKING A LENS BARREL ASSEMBLY

[75] Inventor: Akiyasu Sumi, Yokohama, Japan

[73] Assignee: Canon Kabushiki Kaisha, Tokyo, Japan

[21] Appl. No.: 274,630

[22] Filed: Jun. 17, 1981

[30] Foreign Application Priority Data

Jun. 19, 1980 [JP] Japan ................................. 55-83062
Jun. 19, 1980 [JP] Japan ................................. 55-83063

[51] Int. Cl.³ .......................... B29C 1/14; B29D 1/00
[52] U.S. Cl. ...................................... 264/221; 29/423;
29/424; 29/527.1; 264/161; 264/242; 264/317
[58] Field of Search ................ 264/242, 138, 161, 2.5,
264/221, 1.8, 317; 29/423, 424, 527.1

[56] References Cited

U.S. PATENT DOCUMENTS

| | | | |
|---|---|---|---|
| 1,863,209 | 6/1932 | Shank | 264/138 |
| 2,999,276 | 9/1961 | Morin | 264/138 |
| 3,031,722 | 5/1962 | Gito | 264/161 |
| 3,286,010 | 11/1966 | Gromingen | 264/242 |
| 4,021,524 | 5/1977 | Grimsley | 264/242 |
| 4,115,505 | 9/1978 | Metabi | 264/242 |

*Primary Examiner*—James B. Lowe
*Attorney, Agent, or Firm*—Toren, McGeady and Stanger

[57] ABSTRACT

A lens barrel assembly consisting essentially of a first and second barrel member having helicoid screw threads therebetween which enable said barrel members to be moved axially upon relative rotation therebetween is formed in a molding process wherein one of said barrel members is utilized as a mold element in the formation of the other barrel member with the other barrel member being formed by injection molding of resin material injected into a cavity defined at least in part by the first barrel member. The lens barrel assembly is formed with the barrel members in operative juxtaposition when they are removed from the mold cavity.

3 Claims, 22 Drawing Figures

METHOD OF MAKING A LENS BARREL ASSEMBLY

The present invention relates generally to optical components and more particularly to a method for manufacturing a lens barrel assembly for use in photographic equipment, telescopes, microphotographic instruments, and other optical devices. More particularly, the invention relates to a lens barrel assembly which comprises a first barrel member upon which a lens optical system is mounted and a second barrel member operative to effect axial movement of the first barrel member for operation of the optical system. The optical system may comprise an optical element or optical unit such as a filter or diaphragm device and the barrel members may be operatively connected by screw threads or helicoid means interposed between the first and the second barrel members.

In conventional lens assemblies of the type to which the present invention relates, the first barrel member may be a male barrel within which the lens optical system is mounted and the second barrel may be a female barrel with helicoid screw threads interposed between the male and the female barrel to enable relative axial movement therebetween. A stop mechanism may be interposed between the male and the female barrel in order to limit the axial movement of one relative to the other during positioning of the optical system. In such conventional devices, limitations arise with regard to the accuracy of the helicoid threads in the respective barrels since the threads must be formed by machining techniques. Also, reduction of production costs by development of new materials for the barrel members is limited. With the present state of the art, it has been found difficult to further reduce costs related to the production of photographic instruments.

A further disadvantage of conventional lens mounting assemblies arises because of the separate molding processes which must be performed in the production of the male and female barrels and with regard to the machining of the helicoid threads in that when the members are assembled, engagement of the helicoid portions may result in an unduly large backlash or play. Also, the torque necessary to rotate the barrels relative to each other for axial movement of the lens assembly tends to be relatively large or, conversely, overly light thus failing to provide the operator with a desired feel thereby diminishing the accuracy with which the lens assembly may be manipulated.

The present invention is directed toward provision of a manufacturing technique for producing lens assemblies of the type described whereby reduction of the costs of manufacturing such a lens assembly may be accomplished. The invention seeks to employ synthetic resin materials for either one or both of the male and female barrels with the aim of advantageously reducing the cost of machining which must normally precede assembly of the barrel members. Thus, greater economy with regard to the material which is used in forming the barrels may be achieved since normally such barrels are made of metal such as aluminum or brass and the machining processes involved will produce chips. With the invention, there may also be excluded a lapping step which follows the machining step.

The invention is also directed toward providing a lens barrel assembly wherein smooth cooperation of the helicoid portions may be accomplished.

SUMMARY OF THE INVENTION

Briefly, the present invention may be described as a process for producing a lens barrel assembly wherein one of the barrel members, preferably the female barrel member, is first formed either from a resin material or a metallic material with this female barrel being utilized as a tool or mold for the manufacture of the male barrel member which then may be formed of resin material and which may be molded utilizing the female barrel as part of the mold. Thus, the molding operation serves simultaneously as an assembly step for the male and female barrels.

The invention is also directed toward providing a process for producing a lens barrel assembly wherein, while the male barrel is molded within the female barrel, stop means for defining the range of rotation between the male barrel and the female barrel may be simultaneously formed between both the male and female barrels thereby avoiding accidental disengagement of the male and female barrels from each other when the assembly is completed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
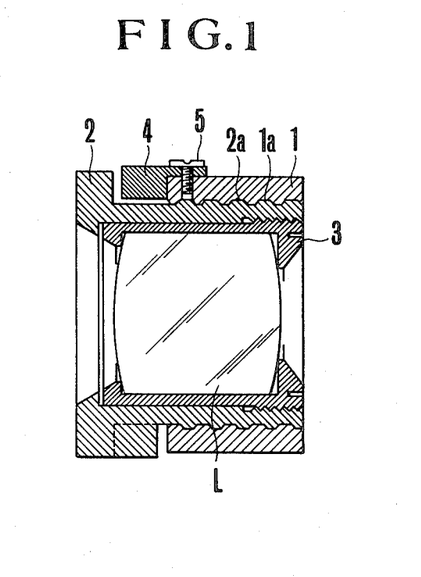
FIG. 1 is a sectional view showing a lens barrel assembly of the type which may be manufactured by utilization of the present invention.
Figure 2:
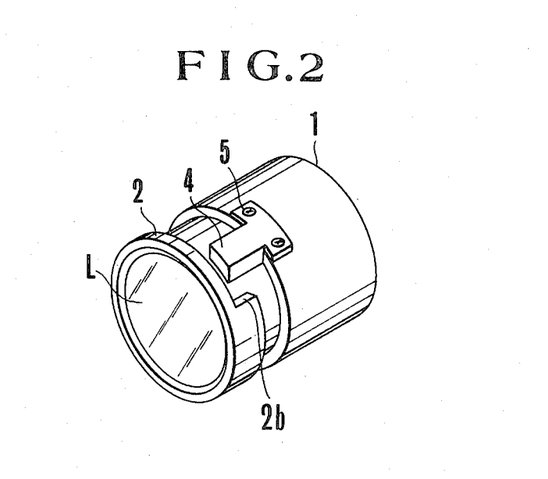
FIG. 2 is a perspective view of the lens barrel assembly of FIG. 1.

Referring now to the drawings, and particularly to FIGS. 1 and 2, there is depicted a lens assembly fo the type which may be manufactured by the present invention depicting parts of the lens barrel assembly as they may be formed using conventional methods. In a conventional process for producing a lens assembly, a female barrel 1 and a male barrel 2 may be made of metallic material or synthetic resin material separately from each other with the barrel members being then brought into meshing engagement along helicoid portions 1a and 2a thereof. A lens optical system L may then be mounted in the male barrel 2 by means of a retaining member 3 with the parts being adjusted in position. A stop member 4 is then affixed to one end of the female barrel 1 by screw fasteners 5 so that forward rotation of the male barrel 2 will be limited by cooperation with a stepped portion 2b formed in the male barrel 2.

When utilizing conventional techniques for manufacturing a lens barrel assembly of the type depicted in FIGS. 1 and 2, limitations arise regarding the accuracy of the screw threaded helicoids 1a and 2a which must be formed. Machining techniques must be utilized and at time excessive play or backlash will develop between the helicoid portions 1a and 2a in such assemblies.

Figure 3:
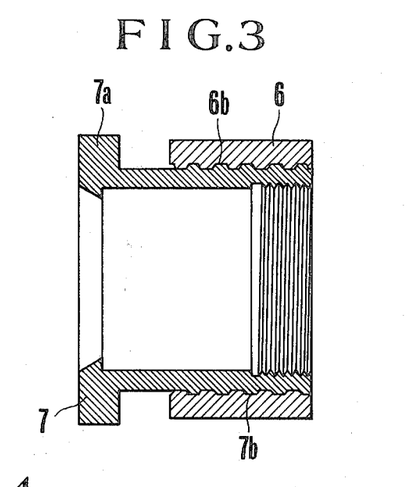
FIG. 3 is a sectional view showing in greater detail male and female barrel members which may be formed by the present invention.
Figure 4:
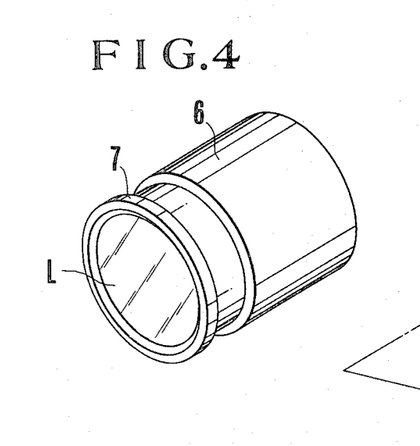
FIG. 4 is a perspective view of the assembly of FIG. 3.
Figure 5A:
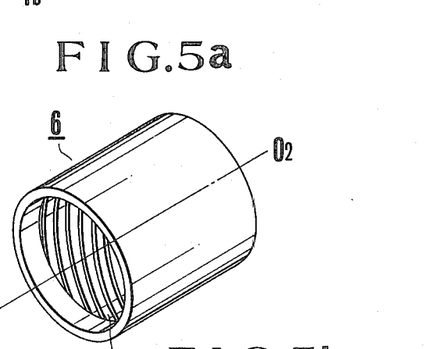
FIGS. 5(a) and 5(b) are, respectively, perspective views of a female barrel member and a male barrel member shown in an exploded arrangement.
Figure 5B:
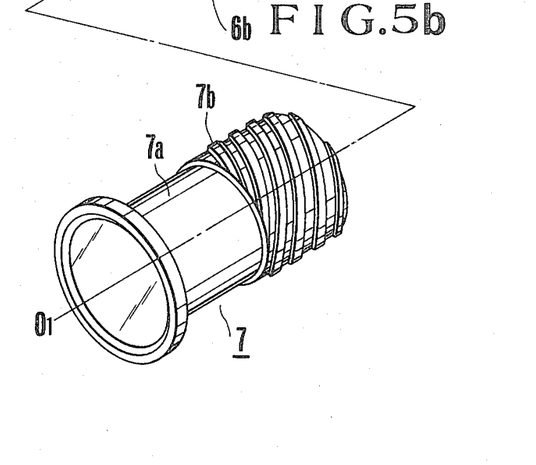

The present invention is directed toward providing a lens assembly of the type shown in FIGS. 1 and 2 by manufacturing techniques which give rise to significant advantages. Parts of an assembly such as may be produced by the present invention are shown in greater detail in FIG. 3, and in FIGS. 4, 5(a) and 5(b). As an example of the application of the present invention, there is depicted a process for producing a male barrel by utilization of the corresponding female barrel as part of the mold wherein the male barrel is injection molded. FIGS. 3 and 4 show an assembly comprising a female barrel 6 and a male barrel 7 produced in accordance with the present invention and adapted to be utilized as a unit for mechanically mounting a lens system.

In the process of the invention, the female barrel 6 is first formed either by machining an aluminum blank or other suitable metallic material in order to form therein a helicoid portion 6b on the inner surface thereof or by molding the female barrel 6 from synthetic resin. The resin material utilized may, for example, be a polyphenylene sulfide resin called "PPS" and commercially available under the trademark Ryton from U.S. Phillips Petroleum Company.

In the subsequent step of forming the assembly, molding of the male barrel 7 is effected with the male barrel 7 being formed from a body 7a and a helicoid 7b fitted in the inner diameter of the female barrel 6.

The molding operation of the invention will be described with reference to FIGS. 6 and 7 which depict the molding apparatus for performing the method of the invention.

Figure 6:
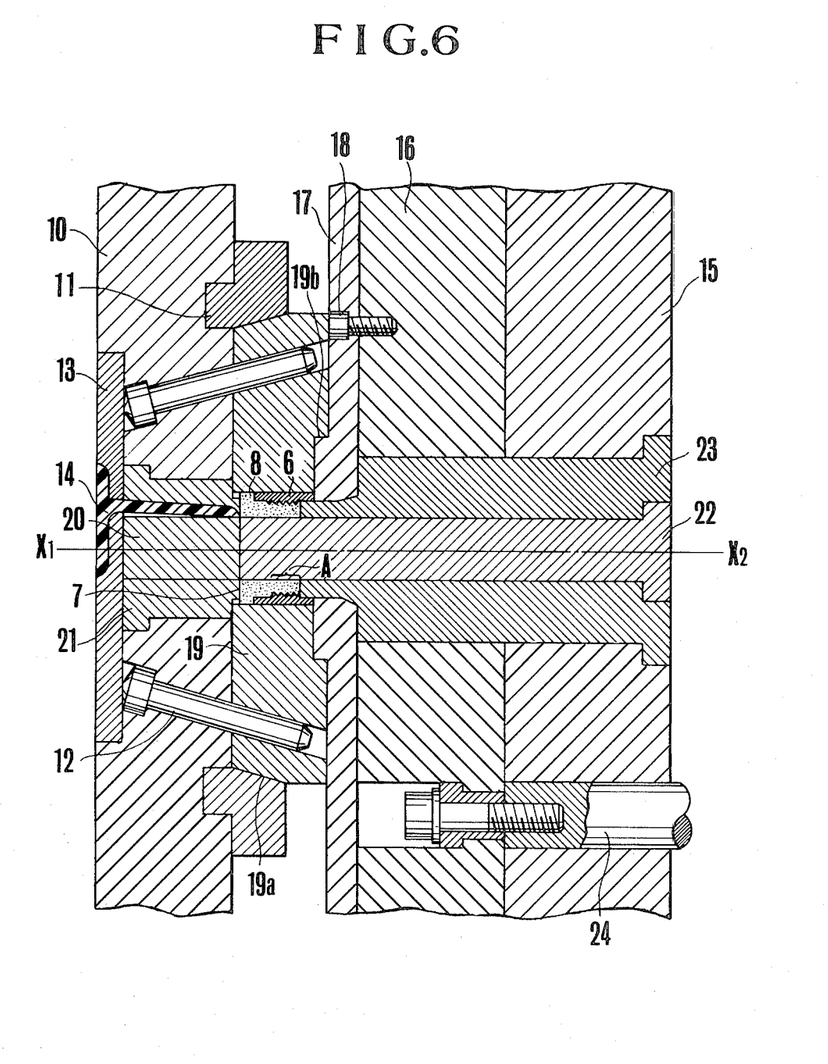
FIG. 6 is a sectional view showing the main parts of molding apparatus for making the lens barrel members of the invention.
Figure 7:
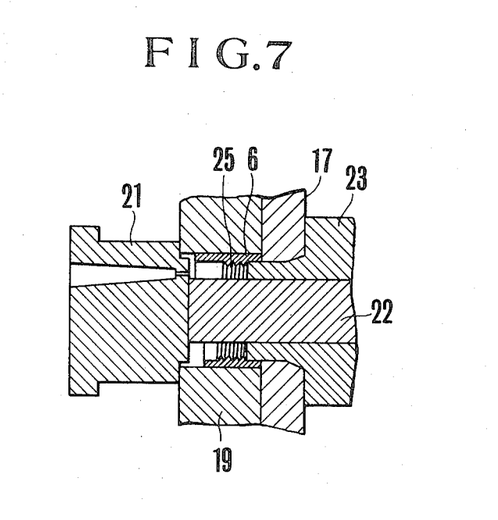
FIG. 7 is a fragmentary sectional view showing on an enlarged scale parts of the apparatus of FIG. 6.

Referring now to FIG. 6, the apparatus with which the process of the present invention may be practiced is shown as comprising a stationary template 10 and a locking block 11 fixedly secured to the template 10. Inclination pins 12 are fitted in respective holes formed in the stationary template 10 and a runner plate 13 is fixedly secured to the template 10 with the plate 13 having defined therein a recess and conduit forming a runner 14 through which molten resin may flow.

The apparatus also comprises a movable template 15, a first stripper plate 16, and a second stripper plate 17 which is fixedly secured with the first stripper plate 16 by screws 18. A slide core 19 is formed with inclined holes into which the inclination pins 12 extend, the core 19 having a tapered outer periphery 19a which contacts the locking block 11. The apparatus also includes a stationary first core 20 and stationary second core 21 as well as a movable first core 22 and a movable second core 23.

In the molding apparatus depicted, each of the cores 20, 21, 22, and 23 is constructed with a number of divided parts so that when the molded barrel is to be pulled out from the metal mold, the diameter over the axis $X_1$-$X_2$ may be shrunk. It is noted that the metal mold core is of such a construction known as a collapsible core, for example, in U.S. Pat. No. 3,247,548.

A return pin 24 operates for pressing the stripper plate 16.

In the molding apparatus of FIG. 6, when the movable template 15 is moved along the axis $X_1$-$X_2$ to the left, the slide core 19 is brought into abutment on the stationary template 10 guided by the inclination pins 12. The slide core 19 is accordingly held stationary in the adjusted position by the tapered surface 19a cooperating with the locking block 11 and by a stepped portion 19b cooperating with the stripper plate 17. The female barrel 6 depicted in FIG. 3 is set in the space of the slide core 19 in fitted relationship therewith, with the remaining space around the movable second core 23 which is indicated as 25 in FIG. 7 being injected with molten resin material and then cooled.

When the male and female barrels are to be removed from the molding apparatus of FIG. 6, the cooled and solidified runner 14 is pulled from the stationary core 21 and runner plate 13, and at the same time the gate of the runner is cut off. Then, the movable template 15 and the first and second stripper plates 16 and 17 are moved in unison to the right along the axis $X_1$-$X_2$ whereby the stationary second core 21 is separated from the inner periphery of the barrel 7.

At the same time, the slide core 19 is moved along the inclination pins 12 whereby the slide core 19 is separated from the outer periphery of the barrel 7.

The pin 24 is then pushed to the left whereby the first stripper plate 16 is separated from the movable template 15. At the same time, the second stripper plate 17 presses the barrel 6 at its end and the movable second core 22 is separated from the inner periphery of the barrel 7. The barrels 6 and 7 are then separated from the second stripper plate 17 and they may then fall by their own weight.

The male and female barrels thus obtained will be in the form of a final assembly with the helicoid portions 6b and 7b thereof arranged in engagement with each other. As the assembly cools, a certain amount of looseness or play between the male and female barrels, and particularly between the helicoid portions thereof, will be created depending upon the shrinkage of the synthetic resin material from the molten state to the solid state. The difference will depend upon the thermal expansions of both materials from which the male and female barrels are formed. In order to ensure that the male and female barrels in the assembly cooperate in a smooth manner with moderate friction, the amount of play is controlled by suitable selection of a combination of materials.

In a first preferred embodiment of the invention the female barrel may be made of a metal such as aluminum and the male barrel may be made of polyphenylene sulfide (PPS) resin or polycarbonate resin.

In a second preferred embodiment of the invention, the female barrel may be made of PPS resin or polycarbonate resin and the male barrel may be made of polyacetal or 6-nylon.

In the latter case, it should be pointed out that care must be taken to protect the female barrel from being melted, deformed or fused with the male barrel when the molten resin is injected.

In accordance with the present invention, since the fitting of the male and female barrel bodies and the threaded engagement of the helicoid portions are automatically effected at the same time, an adjustment of the male and female barrels is automatically formed and there arises no need for a polishing finish or correction work which would otherwise be necessitated after a machining step in accordance with the prior art. Thus, the present invention provides a very economical and efficient process for producing lens barrel assemblies.

Figure 8:
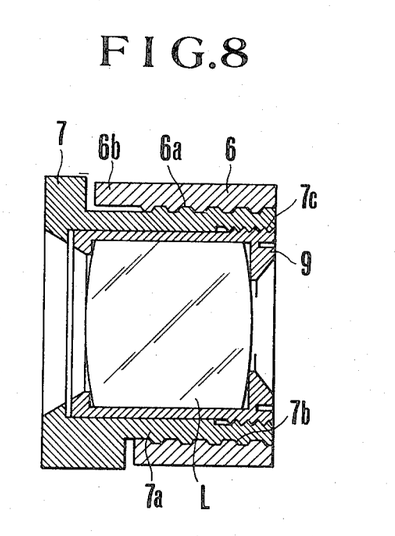
FIG. 8 is a sectional view of the lens barrel assembly manufactured in accordance with the present invention shown with a lens system mounted therein.
Figure 9:
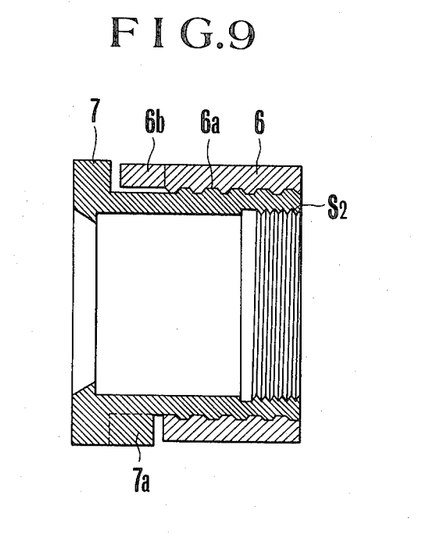
FIG. 9 is a sectional view of a male and female barrel member formed in accordance with a second embodiment of the invention.

In the practice of the present invention a further advantage can be realized if a screw threaded portion 7c, shown in FIG. 8, is provided also on the inner surface of the male barrel 7 for later engagement with a lens retaining ring 9 inasmuch as the formation of the portion 7c will also be automatically effected at the same time that the male barrel 7 is molded, provided that the movable core 22 in the molding apparatus is formed with a corresponding threaded portion at the location A shown in FIG. 6.

The present invention has been described in connection with an application for a lens mounting assembly for photographic cameras. However, in addition to interchangeable lens mounting units for single lens reflex cameras and those permanently mounted on a camera body, there are lens mountings for television cameras, cinematic cameras, video cameras, and other optical instruments to which the present invention may be applied with the advantages described above.

FIGS. 9-16 show another embodiment involving a variation of the principle of the present invention. In this example there is provided for the male barrel 7 and the female barrel 6 stopper portions 7a and 6b, respectively, for limiting the relative rotation between the respective barrel bodies by the shaping and molding techniques depicted in FIGS. 9 and 10 where similar reference characters have been employed to denote parts similar to those shown in FIGS. 3-8.

Figure 10:
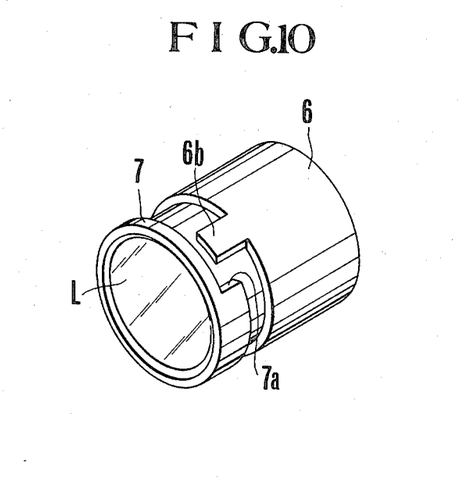
FIG. 10 is a perspective view of the lens barrel assembly of FIG. 9.

In this second example of the invention, the female barrel 6 is made up either of metallic material such as aluminum with a helicoid portion 6a shaped therein or of resin material such as, for example, PPS resin. The female barrel is provided with a projected portion 6b extending axially from one end of the tubular body thereof as shown in FIG. 10.

The molding process for producing the male barrel in the fitted form on the inner diameter of the female barrel 6 will be described with reference to FIGS. 11-13.

Figure 11A:
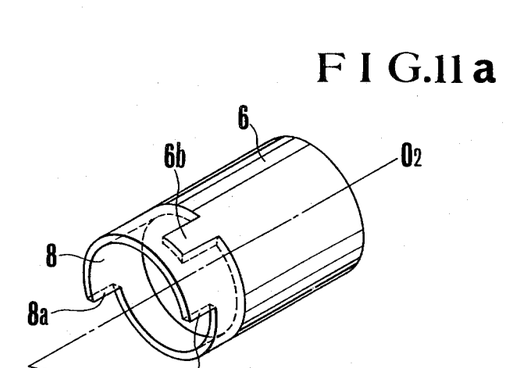
FIGS. 11(a) and 11(b) are, respectively, perspective views of a female barrel member and a male barrel member shown together in an exploded arrangement.
Figure 11B:
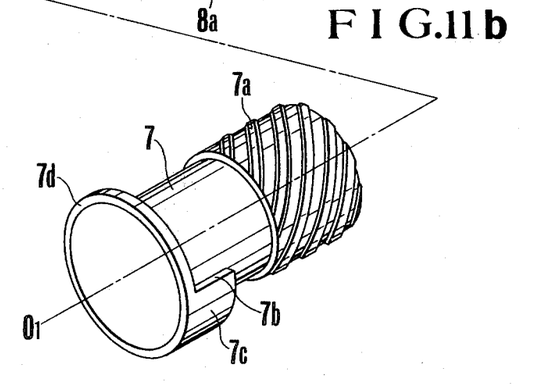
Figure 12:
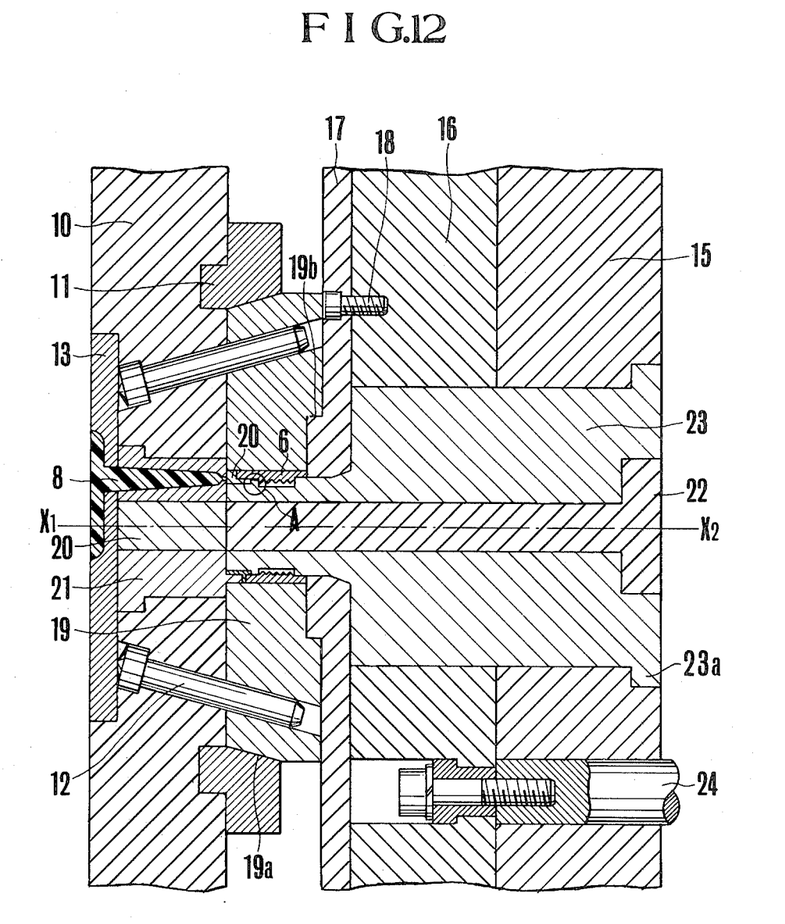
FIG. 12 is a sectional view of molding apparatus for producing the lens barrel assembly of the second embodiment of the invention.

FIGS. 11 and 12 show a first step of the molding process for the male barrel 7 utilizing the female barrel 6, with FIG. 12 being a sectional view of the principal parts of the molding apparatus. As shown in FIG. 12, a stationary template 10 is provided and a locking block 11 is fixedly secured to the stationary template 10 with inclination pins 12 being fitted in inclined holes formed in the stationary template 10.

Figure 13:
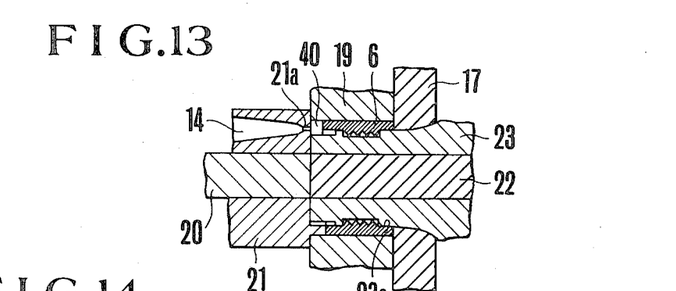
FIG. 13 is a sectional view showing on an enlarged scale parts of the molding apparatus for producing the lens assembly of the second embodiment.

A runner plate 13 fixedly secured to the stationary template 10 is formed with a void or conduit in order to form a runner 14 for the flow of molten resin therethrough, as seen in greater detail in FIG. 13.

The apparatus further includes a movable template 15, a first stripper plate 16 and a second stripper plate 17 fixedly secured to the first stripper plate 16. A slide core 19 is formed with inclination holes into which the inclination pins 12 are inserted and with a tapered surface 19a in contact with the locking block 11. Also provided are a stationary first core 20, a stationary second core 21, a movable first core 22, and a movable second core 23.

Each of the cores 20, 21, 22, and 23 in the molding apparatus is constructed as divided into a number of parts arranged to be shrunk in diameter relative to the direction of the central axis $X_1$-$X_2$ when the molded barrel is removed from the mold apparatus. It is noted that the molding apparatus is of a construction known as a collapsible core from U.S. Pat. No. 3,247,548.

A return pin 24 operates to press the stripper plate 16.

In the molding apparatus of FIG. 12, when the movable template 15 is moved along the axis $X_1$-$X_2$ to the left, the slide core 19 is brought into abutment on the stationary template 10 guided by the inclination pins 12. The slide core 19 therefore stays in the adjusted position by the cooperation of the tapered surface 19a with the locking block 11 and by the stepped portion 19b cooperating with the stripper plate 17. In a space formed by the slide core 19 and the movable second core 23 there is inserted the female barrel 6 shown in FIG. 9 (see also FIG. 13). Since the movable second core 23 has a flanged portion 23a on the outer surface thereof, this flanged portion determines the axial position of the female barrel 6. With the female barrel 6 set in position, there is created a space 40 defined by the second core 23, the female barrel 6, the second stripper plate 17, and the stationary second core 21, as seen in FIG. 13. Molten resin material is then injected through the runner 14 into the space 40. This resin material is used for forming a member 8 shown in FIG. 11(a) adhered to one end of the female barrel 6. The member 8 is later removed by utilization of a solvent or by mechanical means. For this reason, it is preferred to utilize, as the resin material, material such as, for example, polystyrene resin.

As previously mentioned in connection with FIG. 12, the steps of inserting the female barrel 6 into the molding apparatus, injecting the resin into the space 40, and subsequently cooling and extracting the female barrel member will result in the production of a molded cylindrical portion 8 which is adhered to the front end of the female barrel, as depicted in FIG. 11(a). The cylindrical portion has a rear end configured so as to extend about a rotation stopper portion 6(a) and a front end configured with a shape such that half of the round end is stepped down from the other half.

When the molded female barrel 6 and the member 8 are to be taken from the molding apparatus of FIG. 12, the cooled and solidified runner is pulled out from the stationary second core 21 and the runner plate 13 and at the same time the gate is cut off. The movable template 15 and the stripper plates 16 and 17 are then simultaneously moved along the axis $X_1$-$X_2$ to the right whereby the movable second core 23 is separated from the inner periphery of the female barrel 6 and the member 8. At the same time, the slide core 19 is moved along the inclination pins 12 whereby the slide core 19 is separated from the outer periphery of the barrel 6 with the member 8. Then, when the return pin 24 is pushed to the left, the first stripper plate 16 is separated from the movable template 15. At the same time, the second stripper plate 17 pushes the barrel member 6 at the end thereof whereby the movable second core is separated from the inner periphery of the barrel 6. Thus, the female barrel member 6 with the member 8 will be obtained.

Figure 14:
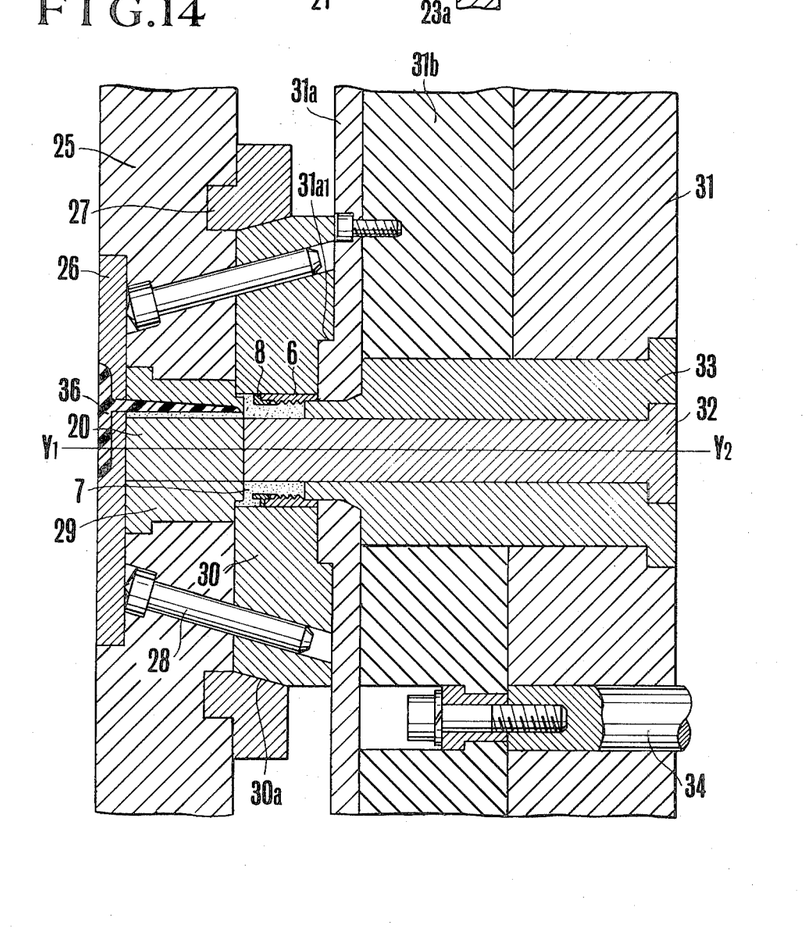
FIG. 14 is a sectional view of a molding apparatus for producing a male barrel member in assembled form with a female barrel member.
Figure 15:
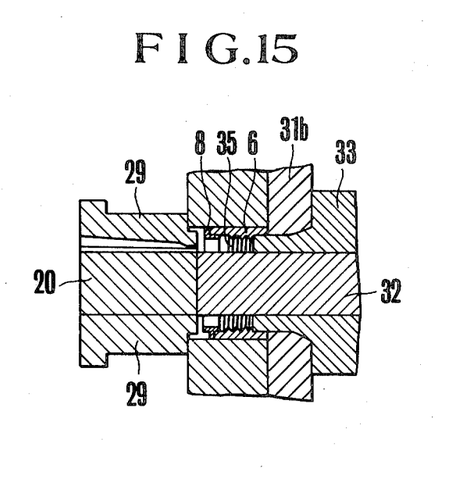
FIG. 15 is a sectional view showing on an enlarged scale parts of the apparatus during an operational step in the molding process.

A second operation for molding a male barrel on the inside of a female barrel 6 with a member 8 may be described by reference to FIGS. 14 and 15. FIG. 14 shows a molding apparatus for producing a male barrel 7 wherein a stationary template 25 is provided together with a runner plate 26, a locking bolt 27, inclination pins 28, a stationary core 29, a slide core 30, a movable template 31, and stripper plates 31a and 31b. Also provided is a movable first core 32, a movable second core 33, and a return pin 34. The molding apparatus of FIG. 14 is similar to that depicted in FIG. 12 with regard to the shape and function of constituent parts.

A female barrel member 6 including a member 8 such as depicted in FIG. 11(a) is inserted into the movable cores 32 and 33 and then the slide core 30 is fitted thereon. When the movable template 31 is moved along the centerline $Y_1$-$Y_2$ to the left, the slide core 30 is guided by the inclination pins 28 and abuts the stationary template 25 in an adjusted position by the upper half surface or tapered surface 30a thereof and a stepped portion $31a_1$ operates with the stripper plate 31a. By this operation, as shown in FIG. 15, there is formed a space 35 by the movable cores 32 and 33, the stripper plate 31a, the slide core 30, the stationary core 29, and the female barrel 6 including the member 8. The space 35 is then filled with a second resin material 36 by injection thereof. This second resin material forms the male barrel 7 which is configured to a shape as shown in FIG. 11(b) having a helicoid portion 7a for engagement with the helicoid portion of the female barrel and with shoulders 7b opposed to the respective shoulders 8a of the recessed portion of the cylindrical member 8 with a thickened portion 7c and a flanged portion 7d being provided.

Figure 16:
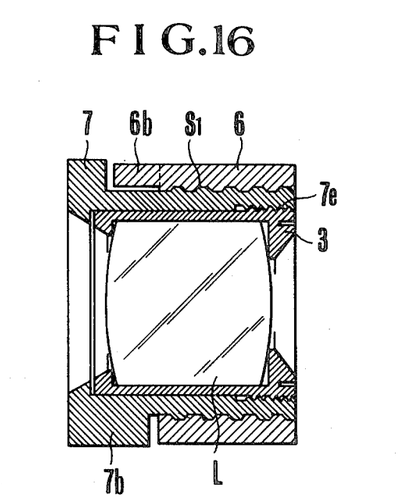
FIG. 16 is a sectional view of a lens barrel assembly having a lens system mounted therein formed in accordance with the invention.

It is noted that when the male barrel 7 is used to mount a lens system, as shown in FIG. 16, a screw threaded portion 7e must be formed in the inner surface thereof. For this purpose, for example, the movable core 32 of FIG. 15 is modified to include a male screw-threaded portion on the outer peripheral surface so that the screw-threaded portion 7e will be formed at the time of the molding operation.

After the male barrel 7 has been molded in the assembled form inside of the female barrel 6, the assembly is removed from the molding apparatus of FIG. 14 in a manner similar to that described in connection with FIG. 6. The assembly in the as-extracted state will include the cylindrical member 8 between the female and male barrels 6 and 7 and this will hinder rotation of the helicoid portions 6a and 7a relative to each other.

In a subsequent step, the assembly is extracted from the molding apparatus of FIG. 14 and is immersed in a chemical solution to remove the cylindrical member 8 which is dissolved by the solution. Thereafter, the male barrel 7 is rendered rotatable relative to the female barrel 6 while rotation of the male barrel 7 is limited by the stopper portion 7b cooperating with the stopper portion 6b of the female barrel 6. The stoppers 6b and 7b also serve as means for preventing the barrels 6 and 7 from slipping away from each other.

In a first preferred embodiment of the invention as described above, the female barrel is made of metal such as aluminum or of polycarbonate resin and the cylindrical member is made of polystyrene resin. The male barrel is made of polyphenylene sulfide resin and the solvent which is utilized is methyl acetate.

As shown in FIG. 16, a cell 3 holding a lens system L is then fitted in the inner diameter of the male barrel 7 and it will stay in the adjusted position by spinning the cell 3 with its screw threaded portion engaging the screw threaded portion 7e of the barrel 7. Then, an adapter for coupling with a mount portion of a camera body is attached to one end of the male barrel 7 or to the female barrel 6 thus completing the lens mount assembly.

In the present invention, the materials from which the female and male barrels 6 and 7 are made are suitably selected in combination so that the coefficients of contraction of the materials will differ from each other with a loose play being automatically created between the male and female barrels, particularly the helicoid portions. Thus, the helicoid engagement will operate smoothly. When practicing the invention, care must be taken with regard to the melting points of each of the resins when the cylindrical member 8 is molded with the use of the female barrel made of resin material and when the male barrel is molded with the use of a cylindrical resin member-adhered female barrel. That is, care must be taken in selecting a combination of resin materials for use as the male and female barrels and the cylindrical member in order to prevent the thermal energy of the molten resin injected into the mold from causing fusion, deformation, or adhesion of the barrel set as part of the mold or the member.

The present invention makes it possible to mold a barrel assembly simultaneously and in unison with a stopper for limiting relative rotation between the barrel members thereby providing an additional advantage in that the assembly, even in the as-extracted state from the molding apparatus, will be free from accidental separation of the male and female barrels from each other.

Furthermore, the female and male helicoids which would otherwise require inspection with regard to whether or not they are well matched will be automatically adjusted to establish a moderate frictional cooperation therebetween and to assure constancy of driving torque from one assembly to another. Therefore, any post-molding treatment of the helicoids is not necessary. This will provide an assembly which will impart a desirable feel or impression to an operator when rotation of the members by engagement of the helicoids is effected.

Figure 17A:
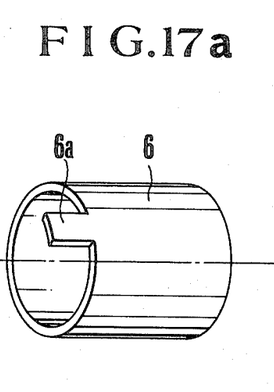
FIGS. 17(a) and 17(b) are perspective views of parts of a lens barrel assembly shown in an exploded arrangement.
Figure 17B:
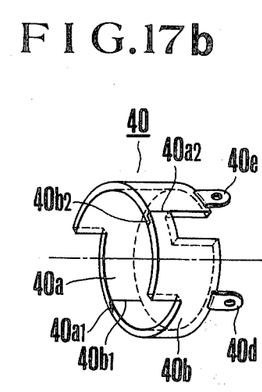

FIGS. 17(a) and 17(b) show another embodiment of the invention. In this embodiment, provision is made of a surplus space for increasing the range of rotation of the male barrel relative to the female barrel by operation of the helicoid portions thereof. In order to achieve this, a special tool is utilized along with the female barrel which serves as a portion of the mold when the male barrel is formed by the molding operation.

As shown in FIGS. 17(a) and 17(b), the female barrel made of resin material or metallic material is attached with a tool 40 at one end thereof. The tool 40 shown in FIG. 17(b) comprises a pair of semicircular members 40a and 40b having butt joints $40a_1$, $40a_2$, $40b_1$, and $40b_2$ which, when coupled with each other, form an integral ring 40.

Figure 17C:
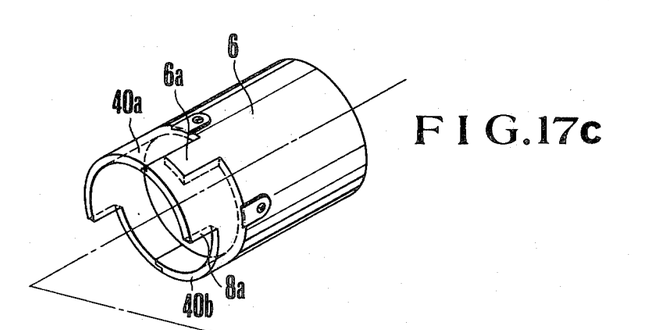
FIGS. 17(c) and 17(d) are perspective views, respectively, of a female barrel member and a male barrel member shown in an exploded arrangement.
Figure 17D:
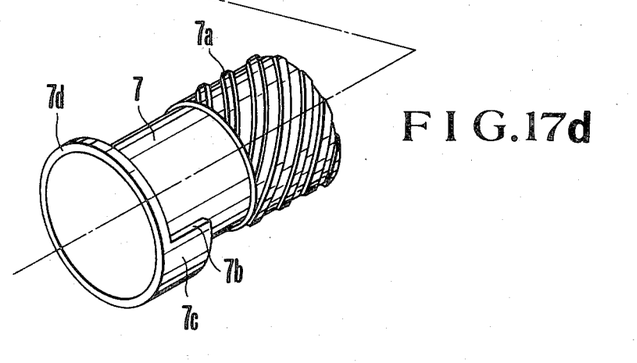

After the ring 40 has been fixedly secured to the female barrel 6 in end to end relationship by screw fasteners penetrating respective projecting portions 40c and 40d thereof, as shown in FIG. 17(c), it is then set in the molding apparatus, an example of which is shown in FIG. 14. A molding operation may then proceed and will then be followed by removal of the ring or tool 40 from the molded assembly. Thus, the male barrel 7 is formed to have an increased range of rotation relative to the female barrel. It will be appreciated that with the embodiment as shown in FIG. 17, the female barrel 6 which may be utilized together with the male barrel 7 shown in FIG. 17(d) will have been formed more economically in a production run which is adapted to repeatedly utilize the tool 40, instead of the cylindrical member 8 previously described which, after having been formed, must be removed by dissolving or pulverization.

While specific embodiments of the invention have been shown and described in detail to illustrate the application of the inventive principles, it will be understood that the invention may be embodied otherwise without departing from such principles.

What is claimed is:

1. A method for making a lens barrel assembly consisting essentially of a female barrel, a male barrel operatively interposed within said female barrel, screw thread means formed respectively on each of said barrels arranged in threaded engagement therebetween to enable said barrels to be moved axially relative to each other upon relative rotation therebetween and stopper means interposed between said male and female barrels for limiting the degree of relative rotation therebetween, said method comprising the steps of: forming said female barrel from at least one of metallic material and a resin material with said respective screw thread means thereon and with a cylindrical portion made from resin material which may be later removed from said female barrel, said cylindrical portion being shaped to operate as a core member forming said stopper means; utilizing said female barrel with said cylindrical portion in molding apparatus as a core element to form said male barrel; forming said male barrel in said molding apparatus from resin material by injecting said resin material in a mold cavity formed at least in part by said female barrel and said cylindrical portion thereby to form said lens barrel assembly with said male and female barrels in operative relationship with said respective screw thread means operatively engaging with each other and with a cooperating portion of said stopper means formed on said male barrel by operation of said cylindrical portion as a core member therefore; removing said lens barrel assembly thus formed from said molding apparatus; and removing said cylindrical portion from said female barrel thereby to enable operative interaction of said stopper means between said male and female barrels.

2. A method according to claim 1 wherein said cylindrical portion is formed on said female barrel in a molding operation separate from the formation of said male barrel and prior thereto and wherein said removing of said cylindrical portion from said female barrel is performed by dissolving with a solvent.

3. A method according to claim 1 wherein said cylindrical portion is removably mechanically connected with said female barrel as a separate part prior to formation of said male barrel.

* * * * *